Nov. 23, 1937.　　　　C. O. HALL　　　　2,099,734
VARIABLE SPEED GEAR TRANSMISSION
Filed May 25, 1935　　　　3 Sheets-Sheet 1

Inventor:
Charles O. Hall

Nov. 23, 1937.  C. O. HALL  2,099,734
VARIABLE SPEED GEAR TRANSMISSION
Filed May 25, 1935   3 Sheets-Sheet 3
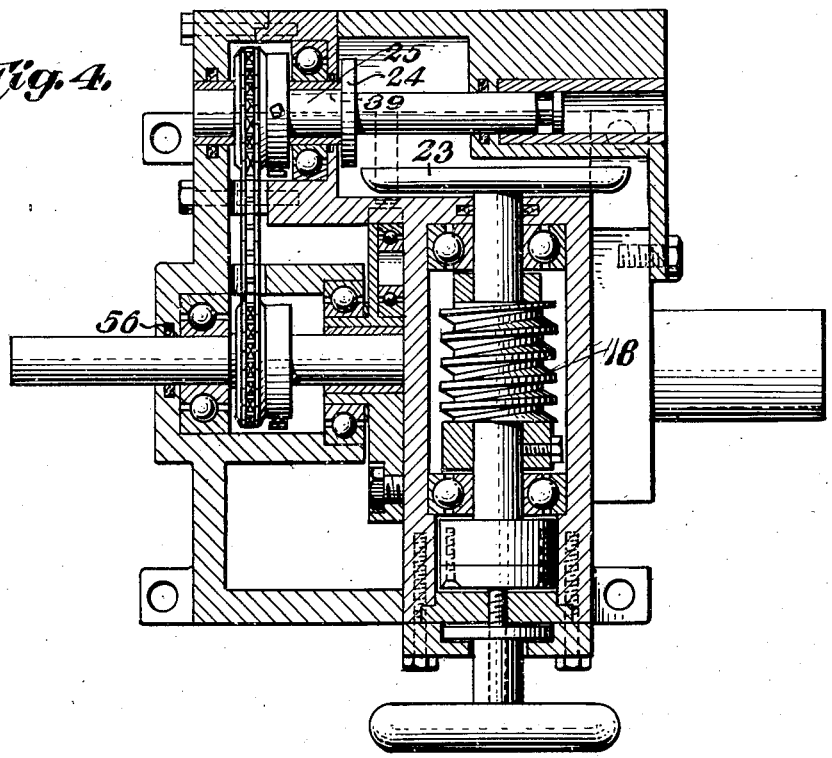

Patented Nov. 23, 1937

2,099,734

UNITED STATES PATENT OFFICE 2,099,734

VARIABLE SPEED GEAR TRANSMISSION

Charles O. Hall, East Orange, N. J.

Application May 25, 1935, Serial No. 23,370

1 Claim. (Cl. 74—285)

The invention relates to improvements in gear transmissions and more specifically to enclosed gear type speed changing transmissions of various types, such as planetary, non-planetary, and gyrating gears, in all of which types the output shaft is caused to rotate by reason of the torque reaction of a stationary member or members, such as internal gears, planet plates, gears which do not rotate on their own axis, torque arms, etc., and wherein the input shaft is caused to turn at a certain speed by means of some external source of power, which velocity is reduced or increased at a predetermined ratio of intermediate gears to a relatively lower or higher velocity of the output shaft.

An object of the invention is to produce a gear transmission wherein the output shaft is caused to rotate at various speeds.

Another object of the invention is to produce a gear transmission of compact and rugged construction wherein the output shaft speed may be varied and regulated without a multiplicity of gears and the customary necessity of shifting from one engagement of gears to another in order to procure a change of speed of the output shaft.

A more specific object of the invention is to produce a gear type, variable speed transmitter wherein the speed of the input shaft as well as the speeds of all the intermediate gears are caused to rotate by the rotation of the input shaft at constant speeds, but the velocity of the output shaft is varied by providing means for rotating the torque reaction member in the rotational direction of the impressed torque.

Still another object of the invention is to provide definite control of the velocity of the torque reaction member, thus regulating the velocity of the output shaft by reducing its speed below its normal speed by the exact number of revolutions at which the torque reaction member is caused or allowed to turn.

The accompanying drawings illustrate one form of the invention, serving to illustrate the structure, principle and method of operation thereof by various views of the same construction wherein the same characters of reference indicate corresponding parts in all views.

Figure 3 is a central vertical section on lines B—B, facing the inside end of the driving shaft and the driving and driven assembly of the speed changing mechanism.

Figure 4 is a top sectional view on lines C—C.

Figure 1:
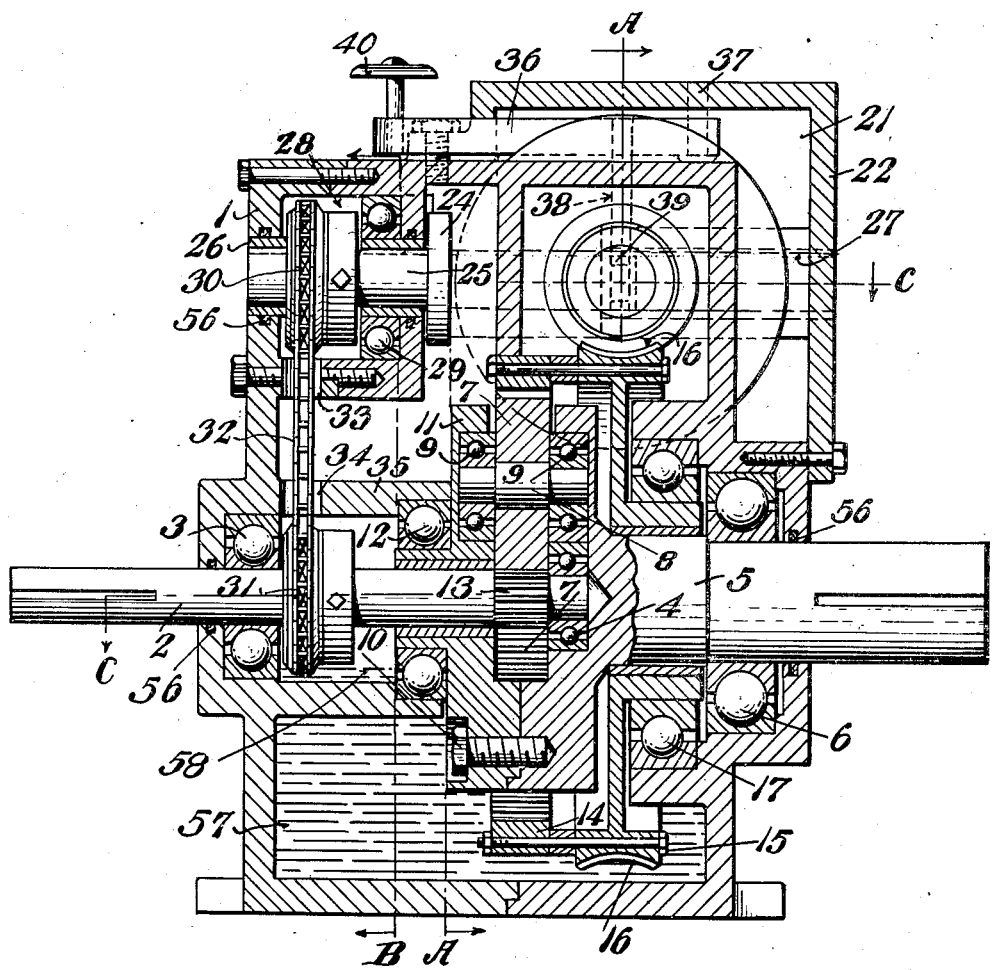
Figure 1 is a central vertical section of the transmission at right angles to the input and output shafts.

Referring now more particularly to Figure 1 for a detailed description of the invention, I designates the external housing of the transmission, 2 the input shaft carried by bearings 3 and 4, 5 the flanged output shaft running in bearing 6 and guided by bearing 4. This shaft is flanged to support the planet gears 7 which run on shafts 8 in bearings 9, said flange being secured to planet plate 11 running in bearing 12 by bolts 10.

Pinion 13 is secured to or cut in shaft 2 and actuates gears 7, which causes the planet plate 11 to rotate planetarily by reason of the torque reaction of the internal gear 14 with which planet gears 7 also engage, thus causing the rotation of the flanged output shaft 5.

The internal gear 14 is secured by bolts 15 to a spoked or webbed serrated ring or worm gear 16 which either runs in or is supported stationary as desired by bearing 17. 18 is a continuous thread screw cut key or worm which either prevents worm gear 16 from rotating or causes it to rotate or unwind in the rotational direction of the direct torque impressed on said worm gear by planet gears 7 through internal gear 14.

Worm 18 is secured to cross shaft 19 carried by bearings 20, and said shaft protrudes through housing 1 into chamber 21 formed by auxiliary housing 22. To this shaft is also secured driven friction disc 23.

Adjacent to and right angularly contactable with disc 23 is driving disc 24 secured to shaft 25 which is splined or slidably keyed within hollow shaft 26 and journalled in bearing 27.

Within auxiliary housing 28 is bearing 29 which carries hollow shaft 26, to which is secured driven sprocket 30. 31 is a driving sprocket secured to shaft 2, and 32 is a chain connecting sprockets 31 and 30 through apertures 33 in housing 28 and apertures 34 in bearing support 35.

Referring now to Figure 1, 36 designates a lever arm pivoted at 37, 38 a pin protruding vertically downward from lever 36 and engaging circular key seat 39 in shaft 25. 40 is a handle secured to lever 36, by means of which lever 36 may be swung on pivot 37, thus engaging disc 24 with driven disc 23 at various radii of disc 23, causing said disc to rotate at various speeds.

Figure 2:
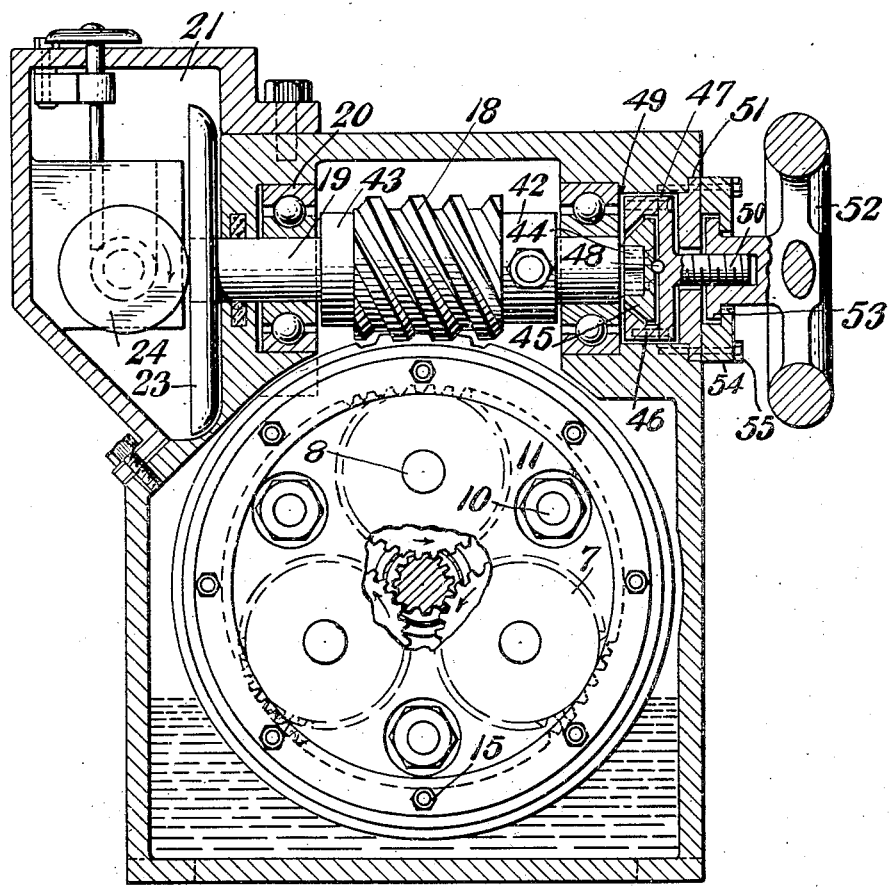
Figure 2 is a central vertical section on lines A—A, facing the inside end of the planet plate and driven members parallel to the shafts.

Referring again more particularly to Figure 2 to trace the direction of rotation of the transmission members, shaft 2 is rotated clockwise facing the outer end, as indicated by the arrow, intermediate gears 7 rotate counterclockwise, as indicated, and the torque reaction of the internal gear is in clockwise direction.

Referring now to Figure 1, driving plate 11 together with flanged output shaft 5 are caused to rotate clockwise. Countershaft 26, splined shaft 25 and driving disc 24 rotate clockwise, driving friction driven disc 23 counterclockwise, facing the back of said disc.

Referring again to Figure 2, worm 18, being right hand threaded, winds worm gear 16 in a counterclockwise direction, which is the same direction as that of the direct torque impressed on internal gear 14, which is secured to said worm gear, by intermediate gears 7, causing a reduction in the velocity of output shaft 5 by the exact number of turns at which the worm gear is rotated or allowed to unwind.

From this explanation and a study of the illustrations, it will be readily seen that turning effort applied to shaft 2 is transmitted through pinion 13 and gears 7 to the planet plate 11 and flanged output shaft 5 by means of the torque reaction of internal gear 14 as long as the internal gear remains stationary or rotates at a velocity of lesser value than the speed of planet plate 11. It will also be readily seen that any rotation imparted to internal gear 14 or any recession from its stationary reactive state which is permitted will have direct effect on the speed of rotation of output shaft 5. If the internal gear is caused or allowed to turn at the same speed as that of the planet plate 11, there will naturally be no turning effort transmitted to the output shaft 5.

Referring again to Figure 2, it will be seen that when the transmission is operated in direction of rotation described worm gear 16 will exert a thrust effort on worm 18 which will cause the worm and worm shaft assembly to move toward driving disk 24 thus creating pressure between said disc and driven disc 23 and effecting proper traction; however if the direction of rotation of the transmission is reversed it will be seen that the thrust tendency of the worm shaft assembly will be in the opposite direction and there will be no traction between said discs 23 and 24.

I have therefore provided means for adjusting the thrust motion of the worm shaft assembly by leaving space between worm hub 42 and bearing 20 and also between spacer 43 and the opposite bearing 20.

44 is a square milled projection on the end of shaft 19 and 45 is a machined disc with a square aperture to fit over the projection 44. Said disc is secured to shaft 19 by screws 46 and has a coned surface on the side adjacent to the round section of shaft 19. The opposite face is flat except for a center indenture which provides a seat for a single ball thrust bearing 48.

Around disc 45 is assembled sectional flange 47 which has an inside coned surface positioned adjacent to the coned face of disc 45 and also a flat face with a central ball indenture adjacent to the flat face of disc 45.

Flange or spider 47 is of such outer contour that it cannot turn in similarly contoured aperture 49 but may be moved laterally in the direction parallel to shaft 19. Integral with said spider is threaded stud 50 which extends through section 51 of housing 1 and is fitted with internally threaded hand-wheel 52. Section 51 is removable.

53 is a flange on hand-wheel 52 having its inner face adjacent to and bearing against section 51 and its outer face bearing against the inner face of sectional, shouldered flange 54. Said flange 54 is secured to section 51 and housing 1 by bolts 55.

By turning hand-wheel 52 in a clockwise direction when facing its outer side it will be seen that coned surfaces 45 and 47 engage and exert a lateral pull on shaft assembly 19, which will disengage driven disc 23 from contact with disc 24 and also have a brake effect on the rotation of shaft 19.

By turning hand-wheel 52 in a counter-clockwise direction it will be seen that said worm shaft assembly 19 will be moved toward driving disc 24 and driving traction will be effected between discs 23 and 24.

This adjustable thrust feature is also, in effect, a clutch, which permits the free adjustment of driving disc shaft 25 forward and back in hollow shaft 26 so that driving disc 24 may be caused to contact driven disc 23 at any desired radius, while the transmission is either running or idle.

The comparatively larger diameter of the worm gear 16 than internal gear 14 gives higher leverage to said worm gear, and the small lead of the teeth of worm 18 combine to make it easier to anchor and control more readily the reactive force effected by the planet plate assembly on the internal gear and prevents the worm gear from being backed up or unwound. This tendency to unwind, however, makes it possible to actuate the worm gear through the described friction mechanism, with the exertion of comparatively little effort.

57 is an oil chamber, 58 indicating the oil contained therein to such a level as will immerse the lower portion of the intermediate transmission and 56 represents oil seals at the various apertures through which the driving and driven shafts protrude. It will also readily be seen that by compounding the mechanism of this transmission, any desired ratio of speed variation may be accomplished.

It will be understood the embodiment of the invention disclosed herein is illustrative but not restrictive and that various changes in form, construction and arrangement may be made within the intention and scope of the following claim.

What I claim is:

A power transmission construction combining an input shaft, a pinion attached thereto, a gear assembly, a torque reaction member having a worm gear secured thereto, a separate transmission for driving a hollow countershaft from the input shaft, a driven flanged output shaft, an oil containing housing to enclose all these parts, having oil seals at the apertures through which the shafts protrude, a driving friction disc on a slidably keyed shaft within the said countershaft and rotated thereby, a driven disc on another shaft positioned right angularly to said countershaft having the driven disc contactable with the driving disc, a worm secured to said right-angle shaft which engages the worm gear attached to and of larger diameter than the torque reaction member whereby rotative motion is transmitted to the torque reaction member, a separate housing applied securely to the oil containing housing, providing a protective chamber for the friction mechanism, means for adjusting the driving friction disc forward and back across the face of the driven disc from its periphery to a position relatively nearer its axis, a pivoted lever having a handle, a pin through said lever positioned to engage a circular keyway in the driving disc shaft, to engage the driving disc with the driven disc at various radii of the driven disc.

CHARLES O. HALL.